United States Patent
Karlsen et al.

(10) Patent No.: US 7,684,384 B2
(45) Date of Patent: Mar. 23, 2010

(54) METHOD FOR BITRATE ADJUSTMENT

(75) Inventors: Per Arne Karlsen, Trollåsen (NO); Geir Scott Nilsen, Osolo (NO); Nils Henrik Lorentzen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1257 days.

(21) Appl. No.: 10/829,921

(22) Filed: Apr. 22, 2004

(65) Prior Publication Data

US 2004/0252651 A1 Dec. 16, 2004

(30) Foreign Application Priority Data

Jun. 5, 2003 (NO) .................................. 20032560

(51) Int. Cl.
*H04L 12/66* (2006.01)
(52) U.S. Cl. ........................ 370/352; 370/235; 370/524; 370/242; 709/231; 709/223
(58) Field of Classification Search ............... 370/110.1, 370/85.6, 242, 394, 524, 223–235, 470; 725/109, 725/110, 127; 709/231, 223, 227; 360/39–41
See application file for complete search history.

(56) References Cited

U.S. PATENT DOCUMENTS

| | | | | |
|---|---|---|---|---|
| 5,463,629 | A * | 10/1995 | Ko | 370/463 |
| 6,426,948 | B1 | 7/2002 | Bowman-Amuah | |
| 6,493,336 | B1 * | 12/2002 | Perry et al. | 370/352 |
| 6,560,201 | B1 * | 5/2003 | Amann et al. | 370/242 |
| 6,765,912 | B1 * | 7/2004 | Vuong | 370/395.2 |
| 6,798,745 | B1 * | 9/2004 | Feinberg | 370/235 |
| 7,266,611 | B2 * | 9/2007 | Jabri et al. | 709/231 |
| 7,283,518 | B2 * | 10/2007 | Vikberg et al. | 370/352 |
| 2002/0199203 | A1 | 12/2002 | Duffy et al. | |

(Continued)

FOREIGN PATENT DOCUMENTS

EP 1045610 A2 10/2000

(Continued)

OTHER PUBLICATIONS

"Configuring Basic Gateway Parameters", Cisco IP/VC 3526 PRI Gateway and Cisco IP/VC 3540 PRI Gateway Module Administrator Guide, pp. 3-1-3-58 (Apr. 25, 2003).

(Continued)

*Primary Examiner*—Curtis Kuntz
*Assistant Examiner*—Phung-Hoang J Nguyen
(74) *Attorney, Agent, or Firm*—Oblon, Spivak, McClelland, Maier & Neustadt, L.L.P.

(57) ABSTRACT

A method and a gateway provide for down speeding the data rate at the circuit switched side of a call being translated in the gateway if the packet switched side does not have sufficient bandwidth capabilities for matching the circuit switched data rate. The gateway compares the bandwidth of the circuit switched and packet switched sides of a call after establishing the connection. If the packet switched side of the call is connected at a lower rate than the circuit switched side, e.g., because of insufficient capabilities of the packet switched endpoint, the gateway initiates a down speeding procedure at the circuit switched side. The down speeding procedure disconnects a number of B-channels of the circuit switched connection to make the call rate equal or lower than the call rate of the packet switched side of the call.

9 Claims, 3 Drawing Sheets

U.S. PATENT DOCUMENTS

2003/0028535 A1 2/2003 Sheldon et al.
2003/0058836 A1 3/2003 Even

FOREIGN PATENT DOCUMENTS

WO WO 01/65780 A1 9/2001
WO WO 02/063840 A1 8/2002

OTHER PUBLICATIONS

"Interoperability Requirements for Nx56/64 Kbits/S Calls", Bandwidth ON Demand INteroperability Group, Version 1.0, Sep. 1, 1992, (39 pages).

* cited by examiner

METHOD FOR BITRATE ADJUSTMENT

RELATED APPLICATION

This application claims priority under 35 U.S.C. § 119 or 365 to Norwegian Application No. 20032560, filed Jun. 5, 2003. The entire teachings of the above application are incorporated herein by reference.

BACKGROUND

Videoconferencing systems are conventionally adjusted to employ both circuit switched and packet switched networks. Thus, great efforts have been made to achieve interoperability between circuit switched and packet switched terminals, allowing interactions and communication without loss of quality or introduction of delay. A common standard for multimedia communications over circuit switched networks such as ISDN is the H.320 standard from the International Telecommunications Union (ITU). H.320 is an umbrella standard for defining the different protocol layers. H.221 is the framing protocol of H.320. The purpose of this recommendation is to define a frame structure for audiovisual teleservices.

The H.323 standard is the corresponding umbrella recommendation for packet switched networks. Such networks are pervasive on many corporate terminals and include TCP/IP and IPX (Inter network packet exchange) over Ethernet, Fast Ethernet and Token Ring network technologies. The H.323 standard provides a foundation for audio, video, and data communications across IP-based networks, including the Internet. Multimedia products and applications complying with the H.323 standard are interoperable, can communicate with each other, and thus are compatible. The H.323 standard or protocol is also made out of many sub standards, one of which is the H.245 standard. The H.245 standard defines the control protocol part of the H.323 standard.

Systems that use different protocols can make video conferencing calls through an H.320/H.323 gateway, which performs the task of "translating" between H.320 and H.323. A typical scenario is where an enterprise, because of cost and management, implements IP as the network to use internally, where they have control of the bandwidth resources available, but uses ISDN externally, where they will not be guaranteed the quality of service on the IP network that they require. Hence, they use a gateway for external calls.

A gateway provides a connection between the respective IP and circuit switched sides of the communication path between endpoints in a multimedia conference. Seen from the endpoints residing at the IP side, the endpoints at the circuit switched side are virtually being converted to IP endpoints, and vice versa. The main tasks of the gateway consequently are to translate and re-pack the data stream across the networks in real-time. The packets transmitted from the H.323 endpoints are temporarily stored in a buffer before they are fetched and arranged in H.320 frames of a fixed size.

A video conferencing call setup from an H.320-based system to an H.323-based system through a gateway typically includes the following steps:

The H.320-based system (A) dials an ISDN-number defined for the gateway.

The gateway accepts the call, and connects the first ISDN B-channel to use.

A BONDING™ procedure is performed, including negotiation of which bandwidth to use for the call, and resolving of which ISDN-numbers A should use to dial the remaining B-channels for the call.

A dials the remaining B-channels to use. The gateway accepts these incoming channels.

An in band communication channel is set up according to H.221 exchanging audio, video and possibly other capabilities.

When the video channel is open, a still image may be encoded in the gateway, and transmitted to A. The image may include text requesting the user of system A to enter the other party's extension (H.323 alias). A voice message may also be presented.

A user of A enters the extension, which may be transmitted to the gateway using DTMF (dual tone multi-frequency) in the audio channel, or through H.320's TCS-4 signal.

When the gateway has received the full extension, the gateway will try to establish an H.323 call to the endpoint registered with this extension (B).

The gateway then initiate a H.323-setup of a call to the called party B by means of RAS-messages (Registration, Admission and Status), Q.931 messages and H.245 messages with the bandwidth used for the H.320 side of the call already initiated. An example of a signal flow at H.323-setup is illustrated in FIG. 1. Normally, the setup is supported by a gatekeeper at the called part (B) side of the connection, i.a. for translating aliases to IP addresses. The setup is also finished by an exchange of the capability information i.a. indicating the bandwidth capability of the endpoint.

When the H.323 call is established, the still image presented to A is removed and the audio and video is repacked and forwarded from A to B and from B to A.

However, if the gateway is unable to set up the call to B on the requested bandwidth (because of lack of resources on B, or in the network), the calls are connected on different bandwidth. A H.320 system and a H.323 system connected through a gateway are not able to use end-to-end flow control. It is only possible for the gateway to send flow control messages to the H.323 system. This bandwidth imbalance is for many reasons an unwanted situation.

A problem also occurs when the H.320 system transmits video at a higher rate than the H.323 system can handle, the H.323 system may fail to handle the call. This may occur if the call is initiated from the H.320 side and the call rate on the H.323 side does not end up being greater or equal to the rate of the H.320 side.

Further, the H.320 call will not utilize its full bandwidth, as the gateway will have to transmit idle pattern to adjust to the lower bandwidth from the H.323 call. This leads to higher ISDN-costs and unnecessary use of resources.

When operating on different bandwidths in the same call, some sort of transcoding has to be performed to adjust the bandwidth used for video data from the H.320 call to the H.323 call. Transcoding uses more resources in the gateway than conventional gateway re-packing, and additionally, full bandwidth of the H.320 call will not be utilized.

SUMMARY

The present invention relates to conferencing, in particular to conferencing calls between terminals of heterogeneous network connected through a gateway.

The features defined in the independent claims enclosed characterize this arrangement and method.

In particular, the present invention discloses a method allowing communication between a first and a second terminal by establishing a packet switched connection between the first terminal and a node, and a circuit switched H.320 connection between the second terminal and the node, creating the circuit switched connection from a first number of ISDN B-channels according to a BONDING protocol, and mutually translating and/or repacking data of the communication between the circuit switched and the packet switched connection. The first terminal is requested for a first data rate reflecting a receiving data rate capability of the first terminal. The first data rate is compared with a second data rate being a data rate of the circuit switched H.320 connection. If the first data rate is lower than the second data rate, a second number of the first number of ISDN B-channels is disconnected and a BONDING resynchronization procedure is executed on the remaining ISDN B-channels to form the circuit switched connection.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 2:
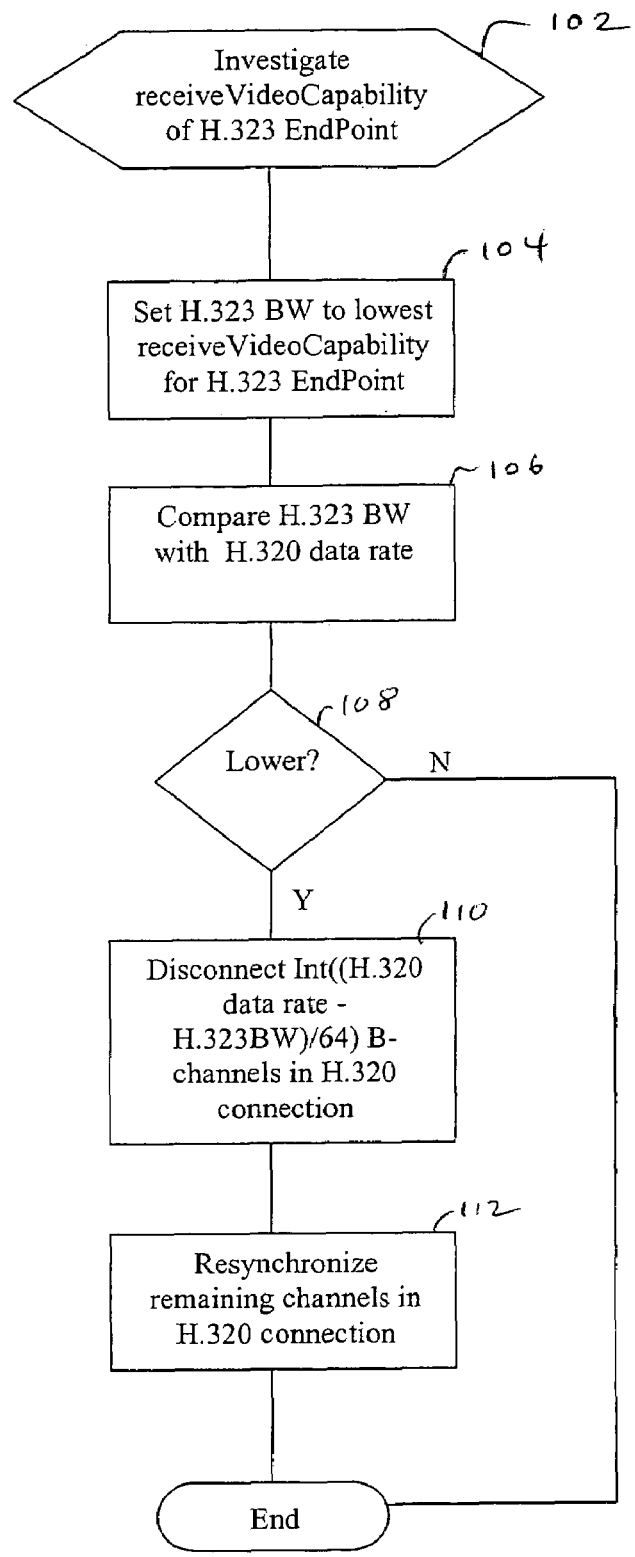
FIG. 2 is a flow diagram showing steps of an example embodiment of the present invention.

According to the present invention, the gateway compares the bandwidth of the H.320 and the H.323 side of the gateway after establishing the connection, i.e., preferably directly after signaling has been completed. Then, if the H.323 side of the call is connected at a lower rate than the H.320 side, e.g., because of insufficient capabilities of the H.323 endpoint, the gateway initiates a down speeding procedure at the H.320 side. The down speeding procedure disconnects a number of B-channels of the H.320 connection to make the call rate equal or lower than the call rate of the H.323 side of the call. FIG. 2 illustrates the present invention by means of a flow diagram with the main steps of an example embodiment of the invention.

Figure 1:
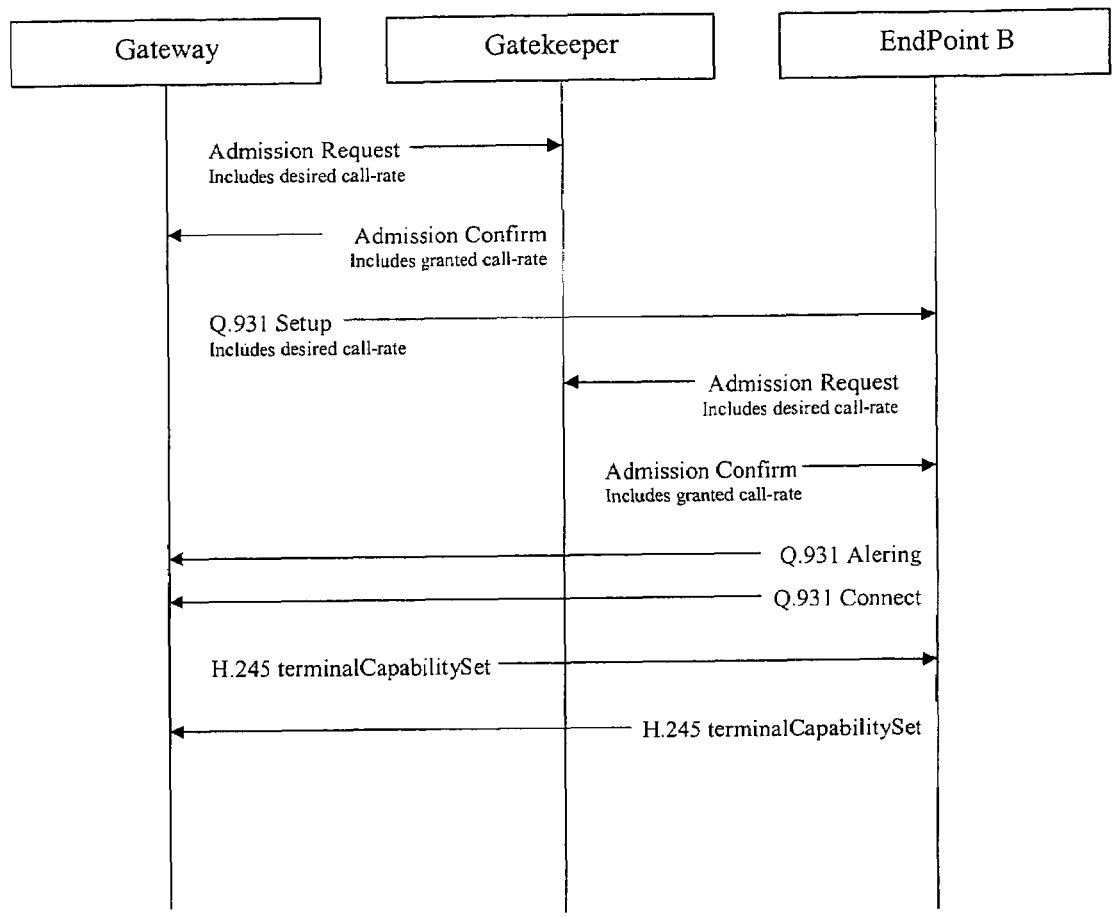
FIG. 1 shows an example of the message flow between gateway, gatekeeper and endpoint at H.323 call setup.

The comparison between H.323 and H.320 bandwidth being used in the already established call may be implemented in various ways. In one embodiment of the present invention, the capability set defined in H.245 is investigated for this purpose at step 102. According to H.245, the capability of a H.323 terminal is disclosed in a number of capability tables, which may be externally accessible by request as indicated at the bottom of FIG. 1. The capability of interest in relation to the present invention is the H.323 endpoint's capability for receiving video at which data rate. This capability resides in a receiveVideo Capability entry of one of the tables. This information may be provided to the gateway by transmitting a Terminal Capability Set message to the terminal. The capability is presented for H.261, H.263 and H.264, respectively. In this embodiment, the lowest video data rate capability among these three protocols, on which the terminal in question is operable, is selected at step 104 as the basis of comparison with the data rate on the H.320 side.

The selected magnitude of the H.323 bandwidth is then compared at step 106 with the magnitude of the H.320 bandwidth of the call, already stored in the gateway. Then, if it is found at step 108 that this magnitude is lower than the bandwidth of the H.320 side of the call, the gateway initiates a down speeding procedure of the H.320 connection between the H.320 endpoint and the gateway. To make sure that the bandwidth of the H.320 is reduced below the H.323 bandwidth, the magnitude of the H.323 bandwidth being used for comparison is converted to the nearest declining magnitude divisible to 64, as 64 kbit/s is the bandwidth of one single B-channel. The multiple of 64 kbit/s of the H.320 bandwidth exceeding the converted magnitude of the H.323 bandwidth would then indicate the redundant number of B-channels that the down speeding procedure should remove from the H.320 connection.

Several ways of executing the down speeding procedure could be imaginable. However, as the establishment of the H.320 side of the call includes BONDING, as described in the background section, it would be convenient to use BONDING as a tool for the down speeding procedure. BONDING is a technique drafted by the BONDING consortium creating frame structures and procedures for establishing a wideband communications connection by combining multiple switched 56/64 kbit/s channels. BONDING is described in the specification "Interoperability Requirements for Nx56/64 kbit/s Calls" issued by the BONDING consortium.

The main task of the BONDING technique is to align data octets of the individual channels. Channels used for the wideband connection are routed independently of each other, thus the data in each channel might be individually delayed relative to the data in other channels. The defined frame structure for each 56/64 kbit/s bearer channel provides for the alignment of data octets from the individual channels to their original sequence before reforming the individual channels into a composite serial data stream at the terminating end.

However, the BONDING technique also includes a procedure for down speeding an already established connection by removing one or more channel of which the connection is composed. This procedure is originally meant to remove channels that erroneously have not reached synchronization. However, the now discussed embodiment of the present invention utilizes this procedure for adjusting the bandwidth at the H.320 side according to the bandwidth of the H.323 side. After determining that down speeding is required, as described above, the down speeding procedure is initiated and follows the one described for the BONDING technique. The redundant channels are disconnected at step 110, the new speed is reflected in the Information Channel, and the remaining channels are resynchronized by equalizing the delays.

The resynchronization of the down speeded H.320 connection at step 112 will take some time. In this time, the gateway should preferably encode a still image, and possibly a voice response to transmit to the H.323 endpoint, informing the user that down speeding is in progress.

Then, when resynchronization is completed, the still images that have been presented to the respective endpoints during down speeding are removed, the call will be connected, and video, audio and other data may be forwarded through the gateway in a conventional way with the bandwidth of the H.320 side adjusted to the H.323 side.

Figure 3:
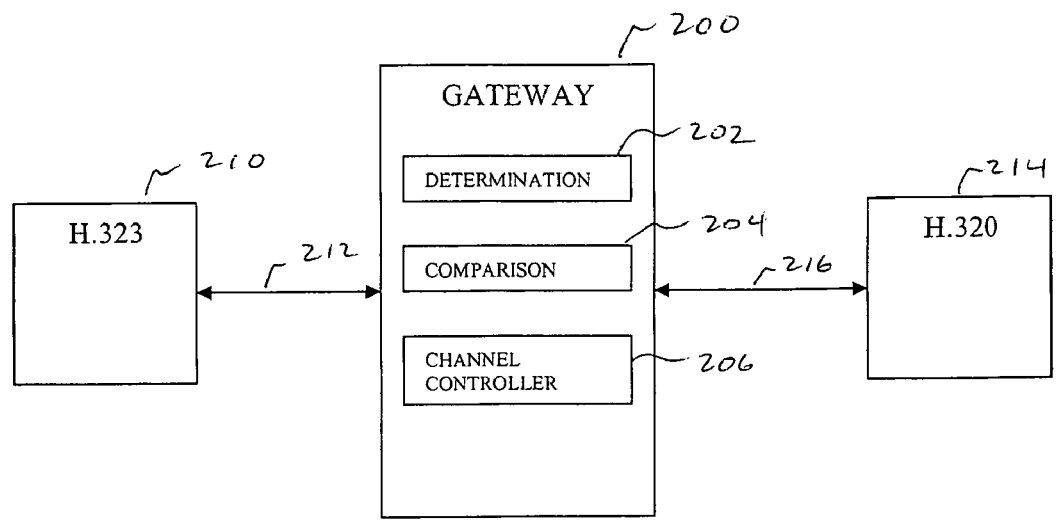
FIG. 3 is a block diagram of a communication system of the present invention.

FIG. 3 illustrates a block diagram of an embodiment of a communication system according to the principles of the present invention. The system includes a gateway node 200, a first terminal 210 and a second terminal 214. The first terminal is an H.323 terminal. The second terminal is an H.320 terminal. A packet switched H.323 connection is established between the first terminal 210 and the gateway node 200 over connection 212. A circuit switched H.320 connection is established between the second terminal 214 and the gateway node 200. The circuit switched connection is established from a first number of ISDN B-channels according to a BONDING™ protocol.

The gateway node 200 includes determination means 202 adjusted to select a first data rate amount from one or more data rate amounts requested from the first terminal 210 reflecting bandwidth capabilities of the first terminal 210. A comparison means 204 at the gateway node 200 is adjusted to compare the first data rate with a second data rate being a data rate of the circuit switched H.320 connection. The gateway node 200 further includes a channel controller 206 that is adapted to disconnect a second number of the first number of ISDN B-channels and to adjust the remaining ISDN B-channels to form the circuit switched H.320 connection if the first data rate is lower than the second data rate.

Note that even if only H.323 is mentioned in the description, the present invention can also be utilized when the packet switched terminal is a SIP (Session Initiated Protocol). SIP is also a protocol for IP video conferencing. The two protocols are very similar, and are only distinguished in the signaling and controlling procedures. Thus, what is described for H.323 above, also applies for SIP.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method allowing communication between a first terminal and a second terminal, wherein the first terminal and the second terminal participate in a video-conference, a web-conference, or a teleconference, the method comprising:
   establishing, with a processing device, a packet switched connection between the first terminal and a gateway;
   establishing, with the processing device, a circuit switched H.320 connection between the second terminal and the gateway, the circuit switched connection being established from a first number of ISDN B-channels;
   receiving, with the processing device from the first terminal, a first data rate reflecting a receiving data rate capability of the first terminal;
   receiving, with the processing device from the second terminal, a second data rate reflecting a data rate of the circuit switched H.320 connection;
   comparing, with the processing device, said first data rate with the second data rate;
   determining, with the processing device, that the first data rate is lower than the second data rate;
   disconnecting, with the processing device, a second number of the first number of the ISDN B-channels so that the packet switched connection has a higher data rate than the circuit switched H.320 connection;
   executing, with the processing device, a resynchronization procedure on remaining ISDN B-channels to form the circuit switched H.320 connection; and
   determining, with the processing device, said second number of the ISDN B-channels to disconnect by converting said first data rate to a multiple of a fixed data rate and subtracting said multiple from an amount of the first number of ISDN B-channels.

2. The method according to claim 1, wherein the packet switched connection is a H.323 connection.

3. The method according to claim 1, wherein the packet switched connection is a SIP connection.

4. The method according to claim 1, further comprising storing said second data rate in a memory device.

5. The method of claim 1, wherein the processing device is the gateway.

6. A gateway, comprising:
   a communication unit configure to establish a packet switched connection between a first terminal and the gateway, and a circuit switched H.320 connection between a second terminal and the gateway, wherein the circuit switched H.320 connection is created from a first number of ISDN B-channels, and the first terminal and the second terminal participate in a video-conference, a web-conference, or a teleconference;
   a determination unit configured to select a first data rate amount from one or more data rate amounts requested from the first terminal reflecting bandwidth capabilities of the first terminal;
   a comparison unit configured to compare said first data rate with a second data rate being a data rate of the circuit switched H.320 connection; and
   a channel controller configured to compare said first data rate with the second data rate, to determine that the first data rate is lower than the second data rate, to disconnect a second number of the first number of the ISDN B-channels, and to adjust remaining ISDN B-channels to form the circuit switched H.320 connection,
   wherein said channel controller is configured to determine said second number of ISDN B-channels to disconnect by converting said first data rate to a multiple of a fixed data rate and subtracting said multiple from the first number of ISDN B-channels.

7. The gateway according to claim 6, wherein the packet switched connection is a H.323 connection.

8. The gateway according to claim 6, wherein the packet switched connection is a SIP connection.

9. The gateway according to claim 6, further comprising a storage device configured to store said second data rate.

* * * * *